United States Patent
Tsiatsikas et al.

(10) Patent No.: US 10,862,824 B2
(45) Date of Patent: Dec. 8, 2020

(54) METHOD AND SYSTEM FOR MANAGING TRANSMISSION RESOURCES IN A SIP-BASED COMMUNICATION SYSTEM

(71) Applicant: Unify Patente GmbH & Co. KG, Munich (DE)

(72) Inventors: Zisis Tsiatsikas, Salonika (GR); Athanasios Pagonis, Vrilissia (GR); Nikolaos Lazaropoulos, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/452,635

(22) Filed: Jun. 26, 2019

(65) Prior Publication Data

US 2020/0007466 A1   Jan. 2, 2020

(30) Foreign Application Priority Data

Jun. 28, 2018  (EP) ..................... 18180307

(51) Int. Cl.
| | | |
|---|---|---|
| G06F 15/16 | (2006.01) | |
| H04L 12/911 | (2013.01) | |
| H04L 12/919 | (2013.01) | |
| H04L 29/06 | (2006.01) | |

(52) U.S. Cl.
CPC .......... *H04L 47/826* (2013.01); *H04L 47/765* (2013.01); *H04L 47/822* (2013.01); *H04L 63/101* (2013.01); *H04L 65/105* (2013.01); *H04L 65/1006* (2013.01); *H04L 65/1073* (2013.01)

(58) Field of Classification Search
None
See application file for complete search history.

(56) References Cited

U.S. PATENT DOCUMENTS

| | | |
|---|---|---|
| 2009/0180378 A1 | 7/2009 | Noel et al. |
| 2009/0225746 A1 | 9/2009 | Jackson et al. |
| 2011/0107364 A1* | 5/2011 | Lajoie ................. H04L 65/1016 725/25 |

(Continued)

OTHER PUBLICATIONS

European Search Report for EP18180307.3 dated Dec. 6, 2018.

*Primary Examiner* — Phuoc H Nguyen
(74) *Attorney, Agent, or Firm* — Buchanan Ingersoll & Rooney PC

(57) ABSTRACT

A method for managing transmission resources in a SIP-based communication system by a SIP registrar server can include receiving a first number of register requests from a first client from the number of clients, each register request corresponding to one slot in the predetermined first time period; receiving a second number of register requests from a second client of the number of clients, each register request corresponding to one slot in the predetermined first time period, wherein the second number of register requests exceeds the acceptable predetermined number of register requests for the second client, and assigning a number of slots not used by the first client within the predetermined first time period to the second client for sending the register requests which exceed the acceptable predetermined number of register requests for the second client. A system for implementation of the method and an apparatus can be utilized in embodiments of the method and the system.

9 Claims, 6 Drawing Sheets

(56) References Cited

U.S. PATENT DOCUMENTS

| | | | |
|---|---|---|---|
| 2012/0182867 A1* | 7/2012 | Farrag | H04W 28/0236 370/230 |
| 2013/0272253 A1 | 10/2013 | Veenstra et al. | |
| 2015/0067819 A1* | 3/2015 | Shribman | H04L 63/029 726/12 |
| 2016/0095016 A1* | 3/2016 | El-Refaey | H04W 16/14 370/329 |
| 2016/0306672 A1* | 10/2016 | Chin | G06F 9/505 |

* cited by examiner

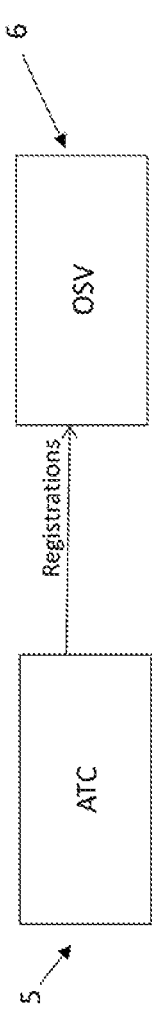
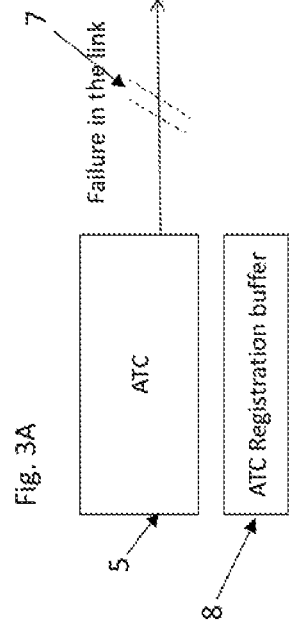
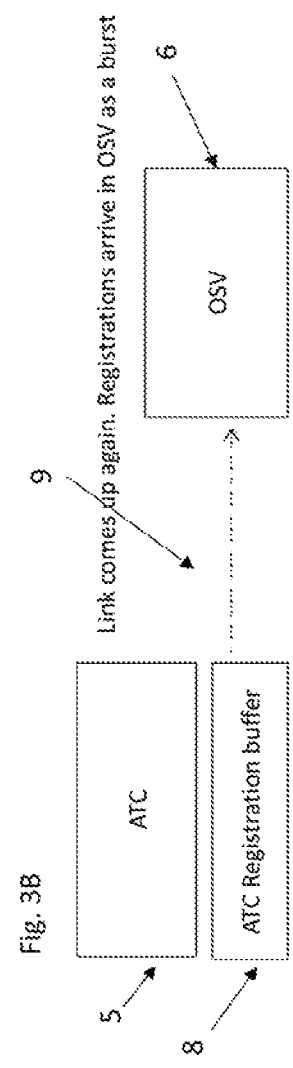
Fig. 3A
Fig. 3B
Fig. 3C

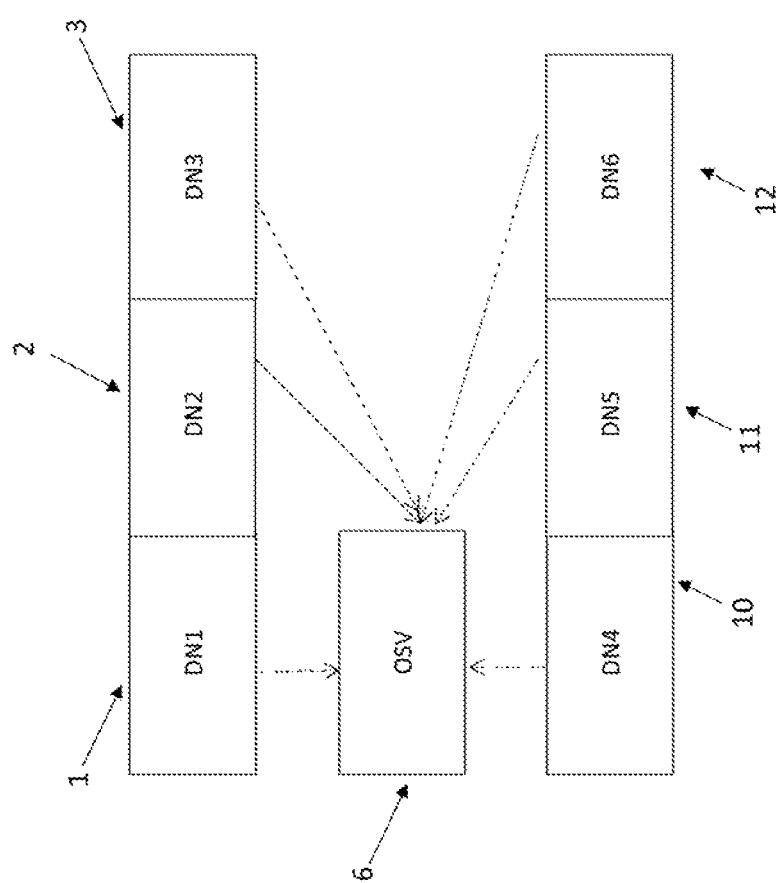

| Time | t1 | t1+x | t1+x+1 |
|---|---|---|---|
| | cTh = 10 | cTh = 10 | cTh = (1+2+3)/2 = 2 |
| | mAs = 4*10 = 40 | mAs = 4*10 = 40 | mAs = 4*2 = 8 |
| | r1 = 13 | r1 = 12 | r1 = 12 |
| | nU1 = 3 | nU1 = 2 | 10+2 |
| | r2 = 3 | r2 = 4 | r2 = 1 |
| | r3 = 1 | r3 = 2 | r3 = 2 |
| | aAs = 16 | aAs = 21 | aAs = 1 |
| | r4 = 11 | r4 = 3 | r4 = 5 |
| | nU4 = 1 | | nU4 = 3 |
| | ACCEPTED: user2, user3 LEND_TO: user1, user4 | ACCEPTED: user2, user3, user4 LEND_TO: user1 | ACCEPTED: user2, user3 LEND_TO: user4 BLACKLISTED: user1 |

Fig. 6

METHOD AND SYSTEM FOR MANAGING TRANSMISSION RESOURCES IN A SIP-BASED COMMUNICATION SYSTEM

CROSS-REFERENCE TO RELATED APPLICATIONS

The present application claims priority to European Patent Application No: EP18180307.3, filed on Jun. 28, 2018. The entirety of this patent application is incorporated by reference herein.

FIELD

The present invention deals with a method for managing transmission resources in a SIP-based communication system as well as with a corresponding system.

BACKGROUND

A common phenomenon in Session Initiation Protocol (SIP) ecosystems are flash events. Such flash events may occur, for example, when a burst of legitimate register requests are received at the SIP registrar server, resulting from a connected client device acting strangely.

In prior art, Intrusion Detection Systems (IDS) are known which are employed for monitoring a network or system with respect to malicious activities or policy violations. However, typical IDS are usually configured so as to work with tight thresholds so that register requests arriving at the registrar server in a burst due to, for example, a flash event as mentioned above will be dropped or blocked although being legitimate, as they will be classified as being part of a Denial of Service (DoS) attack by the IDS.

SUMMARY

It has been determined that it is desirable that such legitimate requests are not dropped or blocked, and only those requests are blocked or dropped which originate from devices exhibiting true abnormal behavior. Therefore, embodiments of the present invention can be based on the object to provide a method and a corresponding system for handling flash events in a more reliable manner. In some embodiments, this object can be address in a method for managing transmission resources in a SIP-based communication system. In other embodiments a system or apparatus can be configured based on this object.

In some embodiments, a method for managing transmission resources in a SIP-based communication system by a SIP registrar server is provided, wherein the SIP registrar server is adapted to receive register requests from a number of clients via a communication network, and to grant a predetermined number of register requests for a predetermined first time period from each client of the number of clients, the method comprising the steps of:
  receiving a first number of register requests from a first client from the number of clients, each register request corresponding to one slot in the predetermined first time period;
  receiving a second number of register requests from a second client of the number of clients, each register request corresponding to one slot in the predetermined first time period, wherein the second number of register requests exceeds the acceptable predetermined number of register requests for the second client;
  assigning a number of slots not used by the first client within the predetermined first time period to the second client for sending the register requests which exceed the acceptable predetermined number of register requests for the second client.

In some embodiments of the method, flash events can be handled in an advantageous manner, since a client that sends more register requests than allowed will be able to do that temporarily without being blackmailed and without reducing the overall performance of the system.

According to a preferred embodiment, the number of slots not used by the first client within the predetermined first time period assigned to the second client corresponds to the number of register requests exceeding the acceptable predetermined number of register requests.

Further, according to another preferred embodiment, the method further comprises a step of monitoring within a predetermined time frame comprising at least the predetermined first time period and a predetermined number of n time periods, the second client as to the slots used for sending register requests in the n time periods, and if the second client has unused slots, re-assigning the unused slots to a pool so as to be available for the first client, or to another client exceeding the acceptable predetermined number of register requests from the number of clients.

Preferably, the acceptable predetermined number of register requests is an adjustable threshold value.

Moreover, it can be advantageous, if the adjustable threshold value is reduced, in case the first client or another client from the number of clients does not exceed the acceptable predetermined number of register requests within the predetermined time frame.

According to still another preferred embodiment, the method can also include a step of blacklisting the second client, if, during the step of monitoring, the second client is identified to have no unused slots.

According to another preferred embodiments, the method can also include a step of calculating statistics for the clients.

A system for managing transmission resources according to an embodiment of a method outlined above or otherwise discussed herein is provided. Embodiments of the system can include a SIP registrar server adapted to receive register requests from a number of clients connected to the SIP registrar server via a communication network, wherein within a predetermined first time period, the registrar server is adapted to accept a predetermined number of register requests from each client of the number of clients. The system can also include:
  means for receiving a first number of register requests from a first client from the number of clients, each register request corresponding to one slot in the predetermined first time period;
  means for receiving a second number of register requests from a second client of the number of clients, each register request corresponding to one slot in the predetermined first time period, wherein the second number of register requests exceeds the acceptable predetermined number of register requests for the second client; and
  means for assigning, at the SIP registrar server, a number of slots not used by the first client within the predetermined first time period to the second client for sending the register requests which exceed the acceptable predetermined number of register requests for the second client.

It should be appreciated that the SIP registrar server can be a type of machine, such as a computer device or a communication device that includes a processor connected to a non-transitory computer readable medium. The SIP register server can include at least one interface and/or transceiver unit to facilitate communications via the communication network with the clients. The clients can also be configured as types of machines. For instance, the clients can be terminal devices that include a processor connected to a non-transitory computer readable medium. Each client can include at least one interface and/or transceiver unit to facilitate communications via the communication network with the clients, the SIP register server, or both the clients and the SIP register server.

Other details, objects, and advantages of the telecommunications apparatus, system, and method will become apparent as the following description of certain exemplary embodiments thereof proceeds.

BRIEF DESCRIPTION OF THE DRAWINGS

The invention and embodiments thereof will be described below in further detail in connection with the drawings.

FIG. 3A, FIG. 3B, and FIG. 3C are schematic illustrations of an exemplary embodiment of a system. FIG. 3A to FIG. 3C schematically illustrate the creation of a flash event between an Advanced Telephony Connector (ATC) and an Open Scape Voice server (OSV); and FIG. 4 schematically shows a flash event or a Distributed Denial of Service (DDoS) attack on an OSV server;

FIG. 6 schematically shows a synopsis of an embodiment of the method for a predetermined time period t1+x+n. Reference numerals utilized in the drawings include:
  1 first client or first user (DN1)
  2 second client or second user (DN2)
  3 third client or third user (DN3)
  4 predetermined time period or time slot
  5 Advanced Telephony Connector (ATC)
  6 Open Scape Voice server (OSV)
  7 link failure
  8 ATC registration buffer
  9 burst of register requests
  10, 11, 12 further clients or users (DN4, DN5, DN6)

DETAILED DESCRIPTION OF EXEMPLARY EMBODIMENTS

Figure 1:
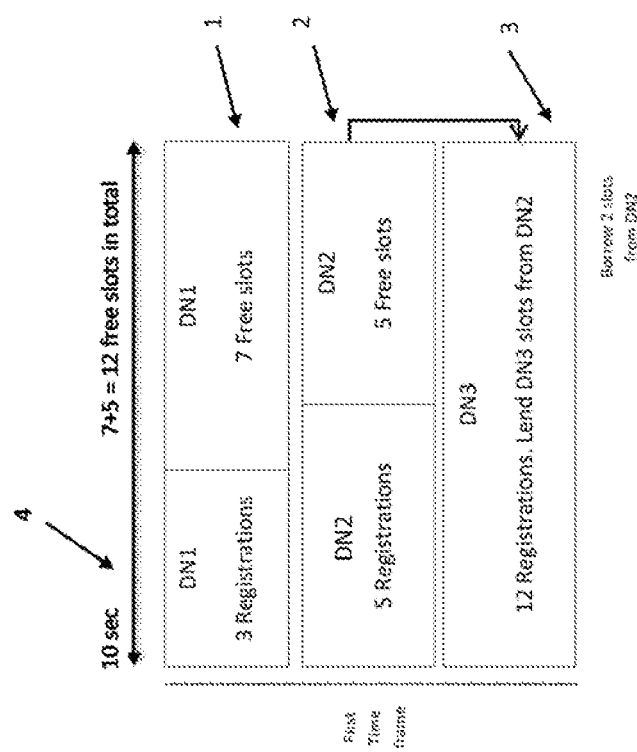
FIG. 1 schematically shows a scheme illustrating the basic principle of the method for managing transmission resources according to an embodiment of the invention.

FIG. 1 schematically shows a scheme illustrating a basic principle for an embodiment of the method for managing transmission resources according to an embodiment of the invention. At first, the SIP registration process is briefly outlined. The typical SIP registration process is started by a user agent (the interface to the user; in the following, however, generally referred to as clients) sending a SIP REGISTER to the SIP registrar server, the request including the user's contact list. Upon receipt, the SIP registrar server sends back a challenge and upon receiving back a correct response, as a valid user ID and password, the SIP registrar server validates the user's credentials and registers the user in its contact data base. Then, the SIP registrar server sends a 200 OK response, which includes the user's current contact list in contact headers.

Here, three client devices are involved, namely, a first client 1, a second client 2, and a third client 3, which are connected to a SIP registrar server (not shown) via a communication network (not shown), and which respectively send register requests (REGISTER) to the SIP registrar server. The SIP registrar server within a predetermined first time period 4, which in this embodiment is 10 seconds, accepts a predetermined number of register requests from each client 1, 2, 3.

Here, each client 1, 2, 3 is allowed to send 10 register requests within the first time period 4 to the SIP registrar server. Each register request is sent within a predetermined slot, so that basically, there are 10 slots for each client 1, 2, 3 available within the first time period 4.

Further, as can be seen in the scheme of FIG. 1, the second client 2 (also indicated via DN2 in FIG. 1) has sent 5 register requests using 5 slots, so that there are still 5 slots available which the second client 2 has not used in the predetermined first time period or time slot 4.

Also, the first client 1 (indicated via DN1 in FIG. 1) has sent three register requests, and thus has still 7 slots available which the first client 1 has not used in the predetermined first time period 4.

However, the third client 3 (indicated via DN3 in FIG. 1) sends twelve register requests, exceeding his "budget" of slots by 2 slots. Thus, in this scenario for three clients 1, 2, 3, the predetermined number of register requests accepted by the SIP registrar server from each client 1, 2, 3 in the first predetermined time period 4 corresponds to a threshold value or current threshold value of 10 registrations, and the maximum of available slots is 30 slots for the first time period 4 in a pool of slots at the SIP registrar server.

Since the first client 1 and the second client 2 do not use all of their available slots in the first time period 4, in the pool of slots, there will be 5 unused slots from the second client 2 and another 7 unused slots from the first client 1, totaling in 12 unused slots which are still available in the first time period 4. Since the third client 3 has exceeded the current threshold value of 10 registrations by sending 12 register requests in the first time period 4, two slots are assigned to the third client 3 from the pool of unused slots. Thus, the third client 3 is able to "borrow" two slots from the pool for sending the two register requests exceeding the current threshold value for that client. Thereby, proper operation of the system can be maintained without affecting its performance, and the third client 3 will not be blacklisted as malicious as it would have otherwise been the case when using an IDS with tight thresholds.

It should be appreciated that the SIP registrar server can be a type of machine, such as a computer device or a communication device that includes a processor connected to a non-transitory computer readable medium. The SIP register server can include at least one interface and/or transceiver unit to facilitate communications via the communication network with the clients. The clients can also be configured as types of machines. For instance, the clients can be terminal devices that include a processor connected to a non-transitory computer readable medium. Each client can include at least one interface and/or transceiver unit to facilitate communications via the communication network with the clients, the SIP register server, or both the clients and the SIP register server.

Figure 2:
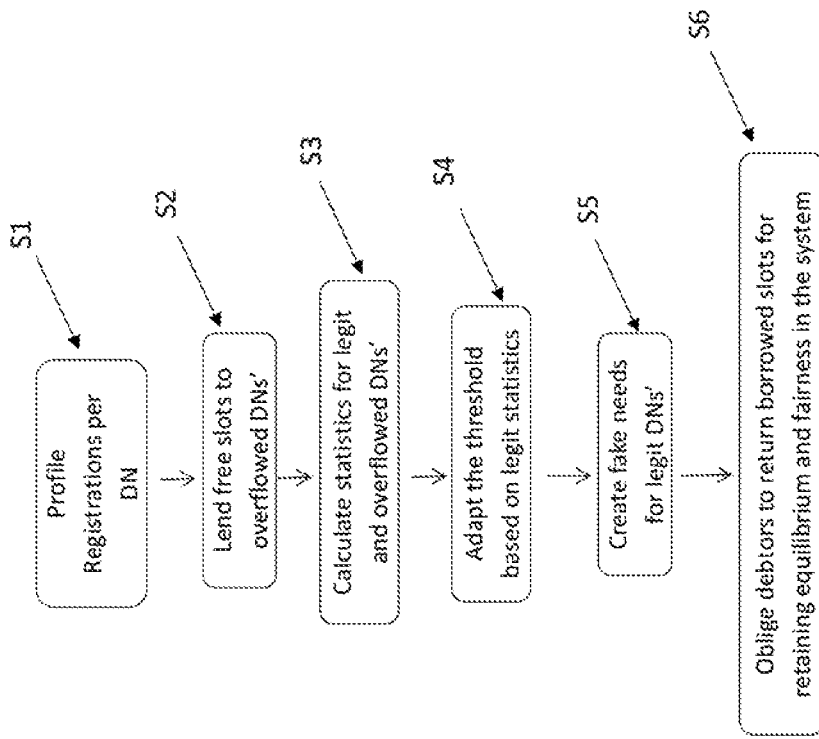
FIG. 2 shows a flow chart of the method for managing transmission resources according to an embodiment of the invention.

FIG. 2 shows a flow chart of the method for managing transmission resources according to an embodiment of the invention. In a first step S1, the register requests or registrations are profiled per client device of the predetermined number of clients or client devices. Then, in a second step S2, unused free slots collected in the pool within the first time period are lent to a client, as the second client 2 shown in FIG. 1, which has produced an overflow. Subsequently, in a third step S3, statistics are calculated for legitimate clients, as the first and third clients 1, 3 in FIG. 1, and overflowed clients, as the second client 2 in FIG. 1. In another subsequent step S4, the threshold, namely, the current threshold value mentioned with respect to FIG. 1, is adapted based on the statistics concerning the legitimate clients. In step S5, then, the method comprises a step of creating fake needs for clients which have been determined to be legitimate, and finally, in step S6, debtors, i.e., clients that have "borrowed" slots from the pool as described in respect of FIG. 1 are forced to return the borrowed slots to the pool.

By this procedure, a fair balancing method can be achieved for all entities of the system. Namely, if e.g., the third client 3 borrows free or unused and available slots in the predetermined first time period or in any subsequent time period following the first time period, then the other clients, as the first client 1 and the second client 2 of FIG. 1, should be able to cover their possible future requirements for slots, in case they are overflowed and thereby exceed the current threshold for that predetermined time period. Then, also these clients should be able to "borrow" slots, as has been described in the example of FIG. 1 for the second client 2.

Thus, using the above described procedure, a nearly malicious client always must reduce the pace of registrations or register requests, because every borrowed slot should be returned back to the pool of the system so as to support the other clients, as outlined above, in case they are confronted with the same problem. Thereby, a truly malicious client device will be detected in any case, since it will never return the borrowed slots to the pool. Such a client, which is not able to return the borrowed slots to the pool will then be blacklisted. However, blacklisting in this case is not based on time, but rather on the slots. Thus, for example, if the third client 3 would borrow 40 slots in the scenario of FIG. 1, and assuming that the other clients do not have increased needs for unused slots from the pool, the third client 3 will be excluded from blacklisting after 4 predetermined time periods, each time period comprising 10 seconds (i.e., 10*4). Using this procedure, a malicious user must always reduce the pace of the register requests. Otherwise, it will remain blacklisted.

Assuming a scenario, in which none of the clients have a future need for additional slots in such a case as described above. Then, the client with the high rate, as the third client 3 mentioned above, will continue to send redundant register requests and the system will continue to lend slots to the third client 3. According to an embodiment, in such a case, the system may gradually reduce the available slots per predetermined time period. That is, if for example, a mean value of the legitimate registrations (i.e., register requests from clients that do not exceed the current threshold value per predetermined time period) is 6, then the system could reduce the predetermined time period to a value slightly above 6, but below 10 when regarding, for example, the scenario depicted in FIG. 1. Other values may, of course, also be implemented according to the system requirements or other parameters.

By adapting the current threshold in the way outlined above, e.g., by reducing it so as to be close to the mean value of the legitimate registrations, some of the corresponding legitimate clients will exceed this lower threshold, too, and need to "borrow" additional slots from the pool. Thereby, a so-called "fake need" is produced, as the threshold has been reduced and some (according to their history) legitimate clients need to borrow additional slots. In this case, the additionally needed slots are taken from the "debtor", in the case described above, this would be the third client 3 which borrowed slots in a previous predetermined time period. If, however, the "debtor" or here, the third client 3 continues to send register requests at a high rate, then it will be blacklisted, because neither the legitimate clients can cope with the tight (reduced) threshold—as they need to "borrow" additional slots, too—nor the debtor will be able to borrow any more slots.

The threshold may be reduced gradually so that the system gradually gets the borrowed slots back to the pool so as to be available for the other legitimate clients.

By the embodiment of the method for managing transmission resources described above, malicious acts can be detected in the network, simply by forcing suspicious client devices to contribute equally to the system.

Summarizing the above, by lending so-called "fake slots" to the legitimate clients by borrowing them from clients which have been detected to be "abnormal" or malicious in the previous time period of a predetermined time frame comprising a number of subsequent time periods, the slots borrowed by the malicious clients can be returned to the pool. Assuming that the "abnormal" devices acted maliciously due to a network failure, like a random failure and not a continuous abnormal action, they should start acting normally after one or more subsequent time periods within the predetermined time frame. Therefore, they should have available slots not used by them and these slots will then be used to cover the so-called fake needs of the legitimate clients. At this point, malicious clients or devices will be forced to act normally.

As mentioned above, blacklisting of "abnormal" devices is based on slots and not on the actual time. Using such a mechanism prevents a malicious device or client from entering the system, because in will never contribute slots to the common pool of slots equally. Thus, a malicious act can be detected quite fast. Also, there is no way to bypass this mechanism, because if a client or device borrows slots from the pool, it will be blacklisted until the slots are returned back to the pool. The process of returning the slots back to the pool is based on the assumption that an abnormal client or device acts maliciously due to failure. This entails that after correcting the error, the device or client should be acting normally again, and the slots will be returned to the pool of the system.

FIG. 3A to FIG. 3C schematically illustrates the creation of a flash event between an Advanced Telephony Connector (ATC) 5 of a client and an Open Scape Voice server (OSV) 6. In FIG. 3A, it is assumed that a number of register requests arrive in OSV or at the OSV 6 through ATC 5. After a link failure 7 between ATC 5 and OSV 6, as shown in FIG. 3B, the register requests that arrive in ATC 5 are buffered in the ATC registration buffer 8. After link recovery, the register requests arrive at the OSV server 6 as a burst 9, as depicted in FIG. 3C.

Assuming, that the first burst 9 consists of 26 registrations. Further, the system is assumed to accept 10 register requests from every client per predetermined time period (as 10 seconds in the example). These register requests are sent from four different users or clients, namely, user1, user2, user3, user4. That is, user1 sends r1=4 registrations, user2 sends r2=9 registrations, user3 sends r3=13 registrations, and user4 sends r4=1 registration. All these register requests are buffered in the ATC 5, namely, in its ATC registration buffer 8, and as communication recovers, the ATC 5 sends the registrations as a burst 9.

According to the method outlined above, the burst will be handled as follows.

The following glossary gives an overview of the terms used:

timeSlot (tX): the time window in which every device is allowed to send registrations currentThreshold (cTh): the upper limit of registrations a device can send on a timeslot maxAvailableSlots (mAS): the maximum number of available slots for a specific timeslot tX from all the devices actualAvailableSlots (aAS): the available number of free slots for a specific timeslot tX slotsNeedsAllUsers (#sNAU): the maximum number of slot needs for a specific time slot tX slotsOwedByUserX (nUX): the aggregate number of slots that a user owes to the system rX: requests sent by user X on a specific timeslot tX The maximum number of available slots in the predetermined (first) time period t1 is 40, namely, maxAvailableSlots=10*4=40.

The system receives 27 registrations in t1 and accepts user4. The available number of free slots for the specific predetermined (first) time period t1 can be calculated as follows:

actualAvailableSlots=39−4=35

The mechanism will serve the next user or client which can be registered without borrowing slots (i.e., user1), then the available slots are:

actualAvailableSlots=39−4=35

Next, the mechanism will serve user2, that is actualAvailableSlots=35−9=26.

The system now must decrease the number of available slots by 10. Number 10 pertains to the maximum limit of each client or user. In this case user3 exceeded this limit.

The system will lend user3, because actualAvailableSlots>#slotsNeedsAllUsers=26>3.

That is, user3 now owes the system or its pool of slots slotsOwedByUser3=3 slots.

New registration arrive in the system in a (second) time period t2 following the predetermined (first) time period t1, or in any subsequent time period t1+x comprised in a predetermined time frame. The system receives the following numbers: r1=2, r2=5, r3=12, r4=2.

Keeping in mind that t1+x, actualAvailableSlots=40−(2+5+10+2)=40−19=21, then the system lends 2 more slots to user3, and now user3 owes #slotsOwedByUser3=#slotsOwedByUser3+3+2=5 slots.

User3 sends new registrations in the predetermined time period t1+x+1, and the system receives the following numbers: r1=4, r2=6, r3=9, r4=4, and the number of slots owed by user3 are #slotsOwedByUser3=5−1=4. User3 sends new registrations in timeslot t1+x+2, and the system receives the following numbers: r2=3, r3=2. Now, user3 returned all the slots to the pool of the system and thus will be allowed to borrow slots again.

If, however, user3 would have presented either a neutral or even an increased number of registrations, then, the system would invoke the elastically-transformed threshold in order to re-obtain the slots from user3.

User3 sends new registrations in timeslot t1+x+1,

FIG. 4 schematically shows a flash event or a Distributed Denial of Service (DDoS) attack on an OSV server 6. In this scenario, each client or device 1, 2, 3, 10, 11, 12 sends a number of registrations at the same time, either randomly or not. At first, the random case will be described; it refers to the well-known flash event. In this case, legitimate clients or users try to reach a service at the same time. The service is not in the position to handle all the requests at once, and most probably will crash. In the second, non-random case, it is assumed that an army of zombies parasitizes in the network. Additionally, a botmaster controls the zombies and conveys commands through the network. That is, in this case, the registrations are part of an (D)DoS attack. In FIG. 4, an abstract overview is depicted of the above described scenarios. It is noted still that a DDoS attack could be launched using a low-rate of traffic.

In this case the following numbers of register requests are received: r1=9, r2=10, r3=5, r4=15.

The maximum number of available slots in the predetermined (first) time period t1 is maxAvailableSlots=10*4=40.

The mechanism receives 40 registrations in t1 and accepts user1, user2, and user3.

The available number of free slots for the specific (first) time period t1 is:

actualAvailableSlots=40−(9+10+5+10)=6.

Thus, the system has 6 free slots and user4 will borrow five slots. After borrowing the five slots, the slots owed by user4 are:

slotsOwedByUser4=5.

The system receives the following registrations in a predetermined (second) time period t1+x: r1=3, r2=4, r3=5, and r4=13.

Now, the available slots are 18, calculated as follows:

actualAvailableSlots=40−(3+4+5+10)=40−22=18.

The system will lend slots to user4, because it reduced the number of registrations in this predetermined (second) time period t1+x, and also because actualAvailableSlots>#slotsNeedsAllUsers=18>3.

After lending the slots, the number of slots owed by user4 is calculated as follows:

slotsOwedByUser4=5+3=8.

Assuming that user4 continues to send an equal or greater number of registrations in the following predetermined time periods (t1+x, t1+x+1, t1+x+2, . . . etc.), then the system is obliged to blacklist user4 until previously borrowed slots are returned back to the pool of the system. In this case, the system will create a fake need by adapting the threshold to the following value:

currentThreshold=(3+4+5)/3=12/3=4.

Using this elastically-transformed threshold, a fake need is created for user3. If this need is not covered by the debtor (user4), then user4 will be blacklisted.

Figure 5:
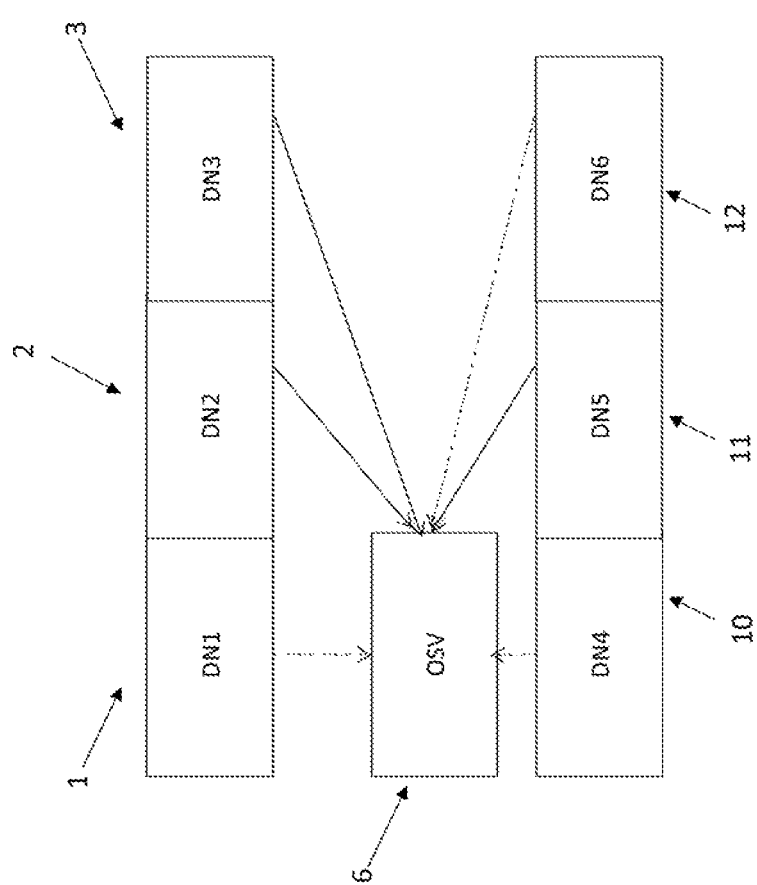
FIG. 5 schematically shows a random software or hardware issue resulting in an abnormal behavior.

FIG. 5 schematically shows a random software or hardware issue resulting in an abnormal behavior. In this embodiment, the occurrence of a critical number of devices or clients malfunctioning due to a software or hardware error is assumed.

Considering the above described cases, it is assumed that in the predetermined (first) time period t1, the following number of registrations is received from different users: r1=13, r2=3, r3=1, r4=11 (see also FIG. 6 for this example). It is also assumed that each predetermined time period t1 to tx equals 10 seconds and each user or client may send up to 10 registrations per time period.

In case, a burst occurs, the following procedure takes place. The maximum number of available slots in t1 is 40, according to maxAvailableSlots=10*4=40.

User2 and User3 conform with the system rules and thus, the are whitelisted for the predetermined (first) time period t1. Thus, the system will need to decide what will happen for user1 and user4.

Considering:

actualAvailableSlots=40−(10+3+1+10)=16 slots, and slotsNeedsAllUsers=3+1=4, and actualAvailableSlots>#slotsNeedsAllUsers=16>4, then the system will decide to lend slots to the user or client that is closer to the ActualAvailableSlots, and fits in this number. That is, both user1 and user4 will enter the system and at the same time, the slots owed by user1 and user4 are:

slotsOwedByUser1=3, and slotsOwedByUser4=1.

The actually available slots are 12, according to actualAvailableSlots=16−(3+1)=12 slots.

In the predetermined time period t1+x, the system receives the following number of registrations: r1=12, r2=4, r3=2, r4=3.

The system accepts user2, user3, and user4. In fact, it seems that user4 has returned 1 slot that has been borrowed in the predetermined (first) time period t1. That is, actualAvailableSlots=40−(10+4+2+3)=40−19=21 slots slotsNeedsAllUsers=2 actualAvailableSlots=21−2=19 slotsOwedByUser1=2.

In a subsequent predetermined time period t1+x+1, the system receives the following number of registrations: r1=12, r2=1, r3=2, r4=5.

At t1+x+1, user1 has sent the same number of registrations. Now, the elastically-transformed threshold mechanism is applied. Namely, a fake need is created in order to force user1 to return the slots to the system. That is, a fake threshold is created that will take a value close to the mean value of the legitimate users or clients or client devices. In this case, this threshold will be calculated as follows:

currentThreshold=(r2+r3+r4)=(1+2+2)/3=2. (e.g. rounding up to next whole number, 2)

Based on this new threshold, user1 will remain out of the system, because there are not more free unused slots available in the pool. In fact another client or user (user4) will also need to borrow. Based on the fact that user4 wants to borrow again and previously lent back its borrowed one slot from time T1, the system requests user1 to return his borrowed slots back to the pool (user1 has already been debtor from the (second) time period t1+x). This is indicated in FIG. 6 by the text "10+2" to indicate that user1 has to return two borrowed slots for use by user4 such that the entire 12 requests (10+2, the 2 being the 2 returned borrowed slots) may not be assigned slots.

Thus, in the predetermined time period t1+x+2, if user1 sends the same or an increased number of registrations, the system will blacklist it until the slots are returned back to the pool (e.g., user1 should present a smaller number of registrations in the next predetermined time period). Or, if user1 sends a small number of registrations in the next predetermined time periods and returns the borrowed slots, then it will be allowed to again borrow slots from the pool, if needed.

The following is noted with respect to the point of time of stopping to lend slots. The latter depends on every client (i.e., what actually happened in the previous predetermined time periods of a time frame). In general, embodiments of the method can apply some fundamental rules. For instance:

a. If there are free slots in the pool in the current predetermined time period, then the system will lend these slots.

b. The users or clients that haven't borrowed from the pool have priority in the lending process.

c. If a bad or abnormal user or client presents the same behavior in t1+x and keeps sending the same or a higher number of registrations, then the system applies the elastically-transformed threshold method in order to retrieve the slots from that user or client.

d. If the bad or abnormal user or client reduces the number of registrations, then this means it returns to a normal condition.

e. A bad or abnormal user or client will be able to borrow only after it has returned all the slots it borrowed back to the pool.

Summarizing the above, and with reference to FIG. 6, the system can follow a fair policy for all clients or users. If a user or client has borrowed slots in a previous predetermined time period within a time frame, then it will be able to borrow again only if the slots have been returned to the pool. After borrowing for the first time, the debtor should reduce the number of registrations at least by one in every next subsequent time period, until all the slots have been returned to the pool. If a debtor presents a neutral or increased behavior in t1+x+n, then it will be blacklisted until all the borrowed slots are returned back to the system. For example, when the debtor (user1) in the example of FIG. 6 presents an increased number of registrations in the predetermined time period t1+x+1, the system adds this user or client to the blacklist. This happens because user1 borrowed 3 slots in t1, borrowed 2 slots in t1+x, and also presented an increased number of registrations in t1+x+1. Thus, based on the procedure described above, a fake need is created for the legitimate user or client in the t1+x+1 time period. Based on the new threshold, user4 presents a fake need, which needs to be covered by user1. This means that user4 remains whitelisted, and the system provides service to this user or client. Nevertheless, user1 may only be able to be removed from the blacklist only if it helps user4.

By the method described above, a simplified approach is provided for using elastically-transformed thresholds in order to handle flash events in SIP ecosystems, getting rid of prerequisites for creating specific rule sets, on the one hand, and adjusting policy-based filtering, on the other hand. Different mechanisms for protocol anomaly detection can be used for detecting anomalies based on legitimated behaviors in order to elastically transform the threshold or filters for blocking abnormal behaviors in SIP ecosystems. In addition, the logic can be enhanced in the above described techniques or mechanisms by introducing flexibility. This can be achieved by using a borrow/return mechanism, on the one hand, and by eliminating a continuous adaptation of rule sets, on the other hand.

It should be appreciated that different embodiments of the system, apparatus, and method can be configured to account for a particular set of design criteria or design objectives. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a system, apparatus, and methods of making and using the same have been shown and described above, it is to be distinctly understood that the invention is not limited thereto but may be otherwise variously embodied and practiced within the scope of the following claims.

The invention claimed is:

1. A method for managing transmission resources in a Session Initiation Protocol (SIP) based communication system by a SIP registrar server, wherein the SIP registrar server is configured to receive register requests from a number of clients via a communication network, and is also configured to grant a predetermined number of register requests for a predetermined first time period from each client of the number of clients, the method comprising:
receiving a first number of register requests from a first client from the number of clients, each register request corresponding to one slot in the predetermined first time period;
receiving a second number of register requests from a second client of the number of clients, each register request corresponding to one slot in the predetermined first time period, wherein the second number of register requests exceeds the acceptable predetermined number of register requests for the second client;
assigning a number of slots not used by the first client within the predetermined first time period to the second client for sending the register requests which exceed the acceptable predetermined number of register requests for the second client, wherein the number of slots not used by the first client within the predetermined first time period that is assigned to the second client corresponds to the number of register requests exceeding the acceptable predetermined number of register requests;
monitoring within a predetermined time frame comprising at least the predetermined first time period and a predetermined number of subsequent further n time periods, the second client as to the slots used for sending register requests in the n time periods, and if the second client has unused slots, re-assigning the unused slots to a pool so as to be available for the first client, or to another client from the number of clients exceeding the acceptable predetermined number of register requests from the number of clients, wherein the acceptable predetermined number of register requests is an adjustable threshold value,
reducing the adjustable threshold value if the first client or another client from the number of clients does not exceed the acceptable predetermined number of register requests within the predetermined time frame; and
wherein the second client is identified to have no unused slots during the monitoring, the method further comprising:
blacklisting the second client.

2. The method of claim 1, further comprising:
calculating statistical values for the clients.

3. A system for managing transmission resources, the system comprising:
a Session Initiation Protocol (SIP) registrar server configured to receive register requests from a number of clients connected to the SIP registrar server via a communication network, the SIP registrar server configured to accept a predetermined number of register requests from each client of the number of clients within a predetermined first time period by an acceptance procedure that accommodates a receipt of register requests that exceeds a pre-selected threshold for each client by a determination process comprising:
in response to receiving a first number of register requests from a first client from the number of clients where register request corresponds to one slot in the predetermined first time period the first number of register requests being below the pre-selected threshold for the first client and also receiving a second number of register requests from a second client of the number of clients where each register request corresponds to one slot in the predetermined first time period, the second number of register requests exceeding the pre-selected threshold for the second client, the SIP registrar server assigns a number of slots not used by the first client that is within the predetermined first time period to the second client for sending the register requests which exceed the predetermined number of register requests for the second client; and
in response to receiving a first number of register requests from the first client within a second predetermined time period that is below a pre-selected threshold by a first number of under threshold registration requests and a second number of register requests within the second predetermined time period from the second client that exceed the pre-selected threshold by a first exceeding threshold number of requests, the SIP registrar server:
adjusting the pre-selected threshold so that the first number of register requests of the second predetermined time period exceed the pre-selected threshold,
allocating slots for the first number of register requests of the second predetermined time period for the first client and
blacklisting the second client until a number of register requests within time periods subsequent to the second predetermined time period are below the pre-selected thresholds for the time periods subsequent to the second predetermined time period sufficient to account for the first exceeding threshold number of requests of the first predetermined time period.

4. The system of claim 3, wherein the SIP registrar server is configured to assign a number of slots not used by the first client within the predetermined first time period to accommodate the registration requests sent by the second client without blacklisting the second client.

5. The system of claim 4, wherein the number of slots not used by the first client that is within the predetermined first time period to the second client for sending the register requests which exceed the predetermined number of register requests for the second client is a number that is determined by deducting the first number of register requests from the pre-selected threshold for the first client.

6. A method for managing transmission resources in a communication system by a server computer device comprising a processor connected to a non-transitory computer readable medium, the method comprising:

the server computer device receiving register requests from a number of clients via a communication network, the number of clients comprising a first client, a second client, a third client, and fourth client;

the server computer device granting and denying registration requests of the clients via a transmission management process, the transmission management process comprising:

in response to receiving a first number of register requests from the first client within a first predetermined time period that is below a pre-selected threshold by a first number of under threshold registration requests and a second number of register requests within the first predetermined time period from the second client that exceed the pre-selected threshold by a first exceeding threshold number of requests:

allocating slots for the first number of register requests of the first predetermined time period for the first client, and determining a number of available slots for the first predetermined time period and allocating slots for the first number of under threshold registration requests to the second client to allocate slots for the second number of register requests of the first exceeding threshold number of requests for the first predetermined time period; and wherein the transmission management process also comprises:

in response to receiving a first number of register requests from the first client within a second predetermined time period that is below a pre-selected threshold by a first number of under threshold registration requests for the second predetermined time period and a second number of register requests within the second predetermined time period from the second client that exceed the pre-selected threshold by a first exceeding threshold number of requests for the second predetermined time period:

allocating slots for the first number of register requests of the second predetermined time period for the first client; and determining a number of available slots for the second predetermined time period and allocating slots for the first number of under threshold registration requests of the second predetermined time period to the second client to allocate slots for the second number of register requests of the first exceeding threshold number of requests for the second predetermined time period.

7. The method of claim 6, wherein the transmission management process also comprises:

in response to receiving a first number of register requests from the first client within a third predetermined time period that is below a pre-selected threshold by a first number of under threshold registration requests for the third predetermined time period and a second number of register requests within the third predetermined time period from the second client that exceed the pre-selected threshold by a first exceeding threshold number of requests for the third predetermined time period:

adjusting the pre-selected threshold so that the first number of register requests of the third predetermined time period exceed the pre-selected threshold, allocating slots for the first number of register requests of the third predetermined time period for the first client; and blacklisting the second client.

8. The method of claim 7, wherein the transmission management process also comprises:

keeping the second client blacklisted until a number of register requests within time periods subsequent to the third predetermined time period are below the pre-selected thresholds for the time periods subsequent to the second predetermined time period sufficient to account for the first exceeding threshold number of requests of the first predetermined time period and the first exceeding threshold number of requests of the second predetermined time period.

9. A method for managing transmission resources in a communication system by a server computer device comprising a processor connected to a non-transitory computer readable medium, the method comprising:

the server computer device receiving register requests from a number of clients via a communication network, the number of clients comprising a first client, a second client, a third client, and fourth client;

the server computer device granting and denying registration requests of the clients via a transmission management process, the transmission management process comprising:

in response to receiving a first number of register requests from the first client within a first predetermined time period that is below a pre-selected threshold by a first number of under threshold registration requests and a second number of register requests within the first predetermined time period from the second client that exceed the pre-selected threshold by a first exceeding threshold number of requests:

allocating slots for the first number of register requests of the first predetermined time period for the first client, and determining a number of available slots for the first predetermined time period and allocating slots for the first number of under threshold registration requests to the second client to allocate slots for the second number of register requests of the first exceeding threshold number of requests for the first predetermined time period; and wherein the transmission management process also comprises:

in response to receiving a first number of register requests from the first client within a second predetermined time period that is below a pre-selected threshold by a first number of under threshold registration requests and a second number of register requests within the second predetermined time period from the second client that exceed the pre-selected threshold by a first exceeding threshold number of requests:

adjusting the pre-selected threshold so that the first number of register requests of the second predetermined time period exceed the pre-selected threshold, allocating slots for the first number of register requests of the second predetermined time period for the first client; and blacklisting the second client until a number of register requests within time periods subsequent to the second predetermined time period are below the pre-selected thresholds for the time periods subsequent to the second predetermined time period sufficient to account for the first exceeding threshold number of requests of the first predetermined time period.

* * * * *